(12) United States Patent
Uszkoreit et al.

(10) Patent No.: US 9,123,336 B1
(45) Date of Patent: Sep. 1, 2015

(54) LEARNING PARSING RULES AND ARGUMENT IDENTIFICATION FROM CROWDSOURCING OF PROPOSED COMMAND INPUTS

(71) Applicant: Google Inc., Mountain View, CA (US)

(72) Inventors: Jakob D. Uszkoreit, San Francisco, CA (US); Percy Liang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/926,675

(22) Filed: Jun. 25, 2013

(51) Int. Cl.
*G06F 17/27* (2006.01)
*G06F 17/20* (2006.01)
*G06F 17/21* (2006.01)
*G10L 15/18* (2013.01)

(52) U.S. Cl.
CPC .................................. *G10L 15/1822* (2013.01)

(58) Field of Classification Search
CPC ....................................................... G06F 17/02
USPC .................................... 704/1, 9, 10, 270–275
See application file for complete search history.

(56) References Cited

U.S. PATENT DOCUMENTS

| 5,212,821 | A | 5/1993 | Gorin et al. |
| 5,797,123 | A | 8/1998 | Chou et al. |
| 7,197,459 | B1 * | 3/2007 | Harinarayan et al. ..... 704/270.1 |
| 8,868,471 | B1 * | 10/2014 | Hullender ....................... 706/12 |
| 2006/0190261 | A1 | 8/2006 | Wang |
| 2012/0290509 | A1 | 11/2012 | Heck et al. |
| 2013/0110498 | A1 * | 5/2013 | Bekkerman ........................ 704/9 |
| 2013/0262114 | A1 * | 10/2013 | Brockett et al. ............... 704/243 |
| 2014/0039870 | A1 * | 2/2014 | Roy et al. ........................... 704/2 |
| 2014/0236571 | A1 * | 8/2014 | Quirk et al. ........................ 704/9 |

FOREIGN PATENT DOCUMENTS

| EP | 834862 A2 | 4/1998 |
| WO | WO0014727 A1 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.
Chen et al., "Diverse Topic Phrase Extraction from Text Collection" WWW 2006, 9 pages.
Gorin et al., "An Experiment in Spoken Language Acquisition", IEEE Transactions on Speech and Audio Processing, 2 (1)(II), 1994, pp. 224-240.
Gupta et al., "Segmenting Spoken Language Utterances Into Clauses for Semantic Classification" in Automatic Speech Recognition and Understanding (ASRU 2003), 2003 IEEE Workshop, pp. 525-530.
Kawahara et al., "Topic Independent Language Model for Key-Phrase Detection and Verification", Acoustics, Speech, and Signal Processing, 1999, 1999 IEEE International Conference, pp. 685-688.

(Continued)

*Primary Examiner* — Jesse Pullias
(74) *Attorney, Agent, or Firm* — Fish & Richardson P.C.

(57) ABSTRACT

Systems, methods and apparatus for learning parsing rules and argument identification from crowdsourcing of proposed command inputs are disclosed. Crowdsourcing techniques are used to generate rules for parsing input sentences. A parse is used to determine whether the input sentence invokes a specific action, and if so, what arguments are to be passed to the invocation of the action.

12 Claims, 6 Drawing Sheets

(56) References Cited

OTHER PUBLICATIONS

Krulwich et al., "Learning user information interests through the extraction of semantically significant phrases" AAAI Technology Report SS-96-05, Compilation, pp. 110-112, 1996.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SennanticRoleLabelingASRU05.pdf.

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng_ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages.

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

\* cited by examiner

LEARNING PARSING RULES AND ARGUMENT IDENTIFICATION FROM CROWDSOURCING OF PROPOSED COMMAND INPUTS

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system develops parsing rules for various commands a user will speak. Upon a successful parse of a command input by a rule, an action associated with the rule is performed (or may be performed subject to user confirmation). There are, however, many possible parses of an input sentence, and thus developing the parsing rules can be resource intensive.

SUMMARY

In general, one innovative aspect of the subject matter described in this specification can be embodied in methods that include the actions of providing, by the data processing apparatus to a first plurality of user devices, a first user interface that includes: a first task definition describing a first user task to generate a command sentence for an action; a first set of non-terminal fields, each non-terminal field in the set listing a non-terminal type and a terminal that parses to the non-terminal type; and a command sentence input field in which a user-generated command sentence is input by the user; receiving, by the data processing apparatus and from the plurality of user devices, user-generated command sentences input into the command sentence input field; providing, by the data processing apparatus to a second plurality of user devices, a second user interface that includes: one of the user-generated command sentences selected from the received user-generated command sentences; the first set of non-terminal fields, each non-terminal field in the first set listing the non-terminal type and the terminal that parses to the non-terminal type; a second task definition describing a second user task to classify each of a plurality of n-grams of the command sentence as belonging to one of: the non-terminal types in the set of non-terminal types; or none of the non-terminal types in the set of non-terminal types; receiving, by the data processing apparatus and from the second plurality of user devices, second user task response data classifying the n-grams of the command sentence, wherein for each non-terminal type at least a respective first set of n-grams are classified as belonging to the non-terminal type and at least a second set of n-grams are classified as belonging to none of the non-terminal types. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing, by a data processing apparatus, data specifying a set of actions, each action defining a user device operation that is different from user device operations for each other action; for each action: accessing, by the data processing apparatus, a corresponding set of command sentences for the action, and for each command sentence, accessing user task response data classifying n-gram of the command sentence into at least a respective first set of n-grams belonging to non-terminal types and at least a second set of n-grams belonging to none of the non-terminal types; generating, by the data processing apparatus, command grammars for the action, each of the command grammars defining non-terminals of each of the non-terminal types and at least one terminal defining at least one of the second set of n-grams; and persisting the command grammars to a command model that facilitates, for each command grammar, the generation of an action score for the action from a bottom-up parse of an input sentence using the command grammar. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, by a user device, for each action of set of actions, a command model corresponding to the action, each command model defining grammars for the action, each grammar including non-terminals of non-terminal types and terminals, the command model facilitating the generation of an action score for the action for an input sentence of n-grams; receiving, by the user device, an input sentence of n-grams; parsing the input sentence of n-grams by the grammars, and, for each grammar for which there is a successful parse, generating a respective action score for the action to which the grammar corresponds; determining, from the command models, an action invoked by the input sentence based on the respective action scores, the action being one of the actions in the set of actions; and performing the action by the user device. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system allows users to specify terminals and non-terminals for grammars without the users having a detailed understanding of grammars. This enables the collection of data from a pool of users large enough to support crowdsourcing techniques to learn the parsing rules from the user inputs. The resulting rules may be in the form of context free grammars that facilitate a bottom-up parse of an input sentence. By implementing a bottom-up parse, only the grammars that successfully parse to a start symbol S root node can be used to determine whether a corresponding action is invoked.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A system uses crowdsourcing techniques to generate rules for parsing input sentences. The parse is used to determine whether the input sentence invokes a specific action, and if so, what arguments are to be passed to the invocation of the action.

To generate the rules, the system implements two data collections for each action in a set of actions. In the first collection, the system provides a first user interface to user devices. The first user interface includes a first task definition, a first set of non-terminal fields, and a command sentence input field. The first task definition describes a first user task to generate a command sentence for an action. Each non-terminal field lists a non-terminal type and terminals that parses to the non-terminal type. The terminals may be example arguments for the action, and the non-terminal types are variables. For example, for a texting action, the non-terminal types may be "Recipient" and "Message," and the terminals may a name of an example recipient, and an example text message. The command sentence input field is a field in which a user inputs a user-generated command sentence in accordance with the first user task described by the first task definition. The data input by the users for the first collection are collected by the system.

In the second collection, the system provides a second user interface to user devices. The second user interface includes one of the user-generated command sentences, a first set of non-terminal fields, and a second task definition. The user-generated command sentence is one selected from the received user-generated command sentences. The first set of non-terminal fields each list the non-terminal type and the terminal that parses to the non-terminal type. For example, as described above, the non-terminal types may be "Recipient" and "Message," and the terminals may be the name of an example recipient, and the example text message. The second task definition describes a second user task to classify each of the terms (e.g., n-grams) of the command sentence as belonging to one of the non-terminal types in the set of non-terminal types, or none of the non-terminal types in the set of non-terminal types. The data input by the users for the second collection are collected by the system.

For each action, the data received from the second collection are used generate command grammars for the action. Each of the command grammars defines non-terminals of each of the non-terminal types and at least one terminal. The command grammars are then provided to user devices, which then use the command grammars to parse input sentences to determine whether an input sentence invokes a particular action.

Example Environment

Figure 1:
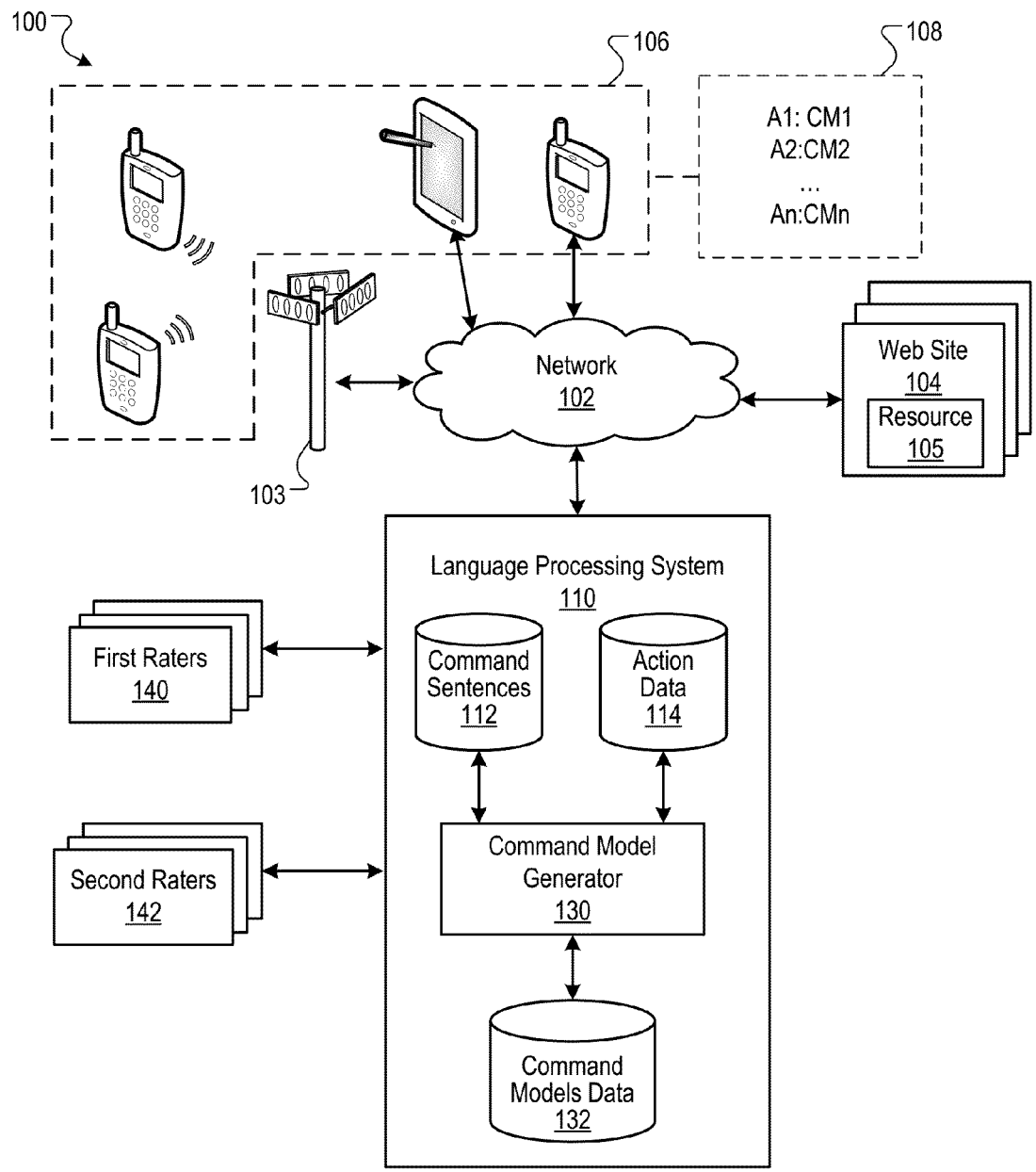
FIG. 1 is a block diagram of an environment in which crowdsourcing is used to generate parsing rules for command inputs.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

In addition to providing content, particular websites 104 may also provide one or more services. Example services include a search service provided by a search engine, video serving provided by video hosting servers, a mapping service providing by a map server, and so on.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 6 below. The user devices 105 may communicate over the networks 102 and 103 by means of wired and wireless connections with the networks 102 and 103.

Figure 6:
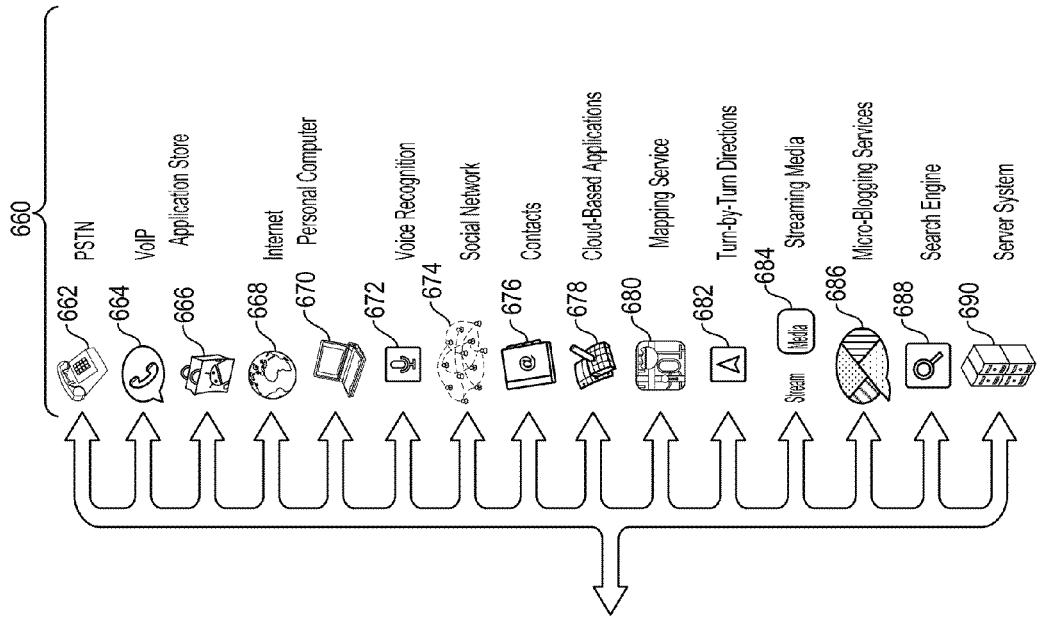
FIG. 6 is a block diagram of an example mobile computing device.
Figure 6:
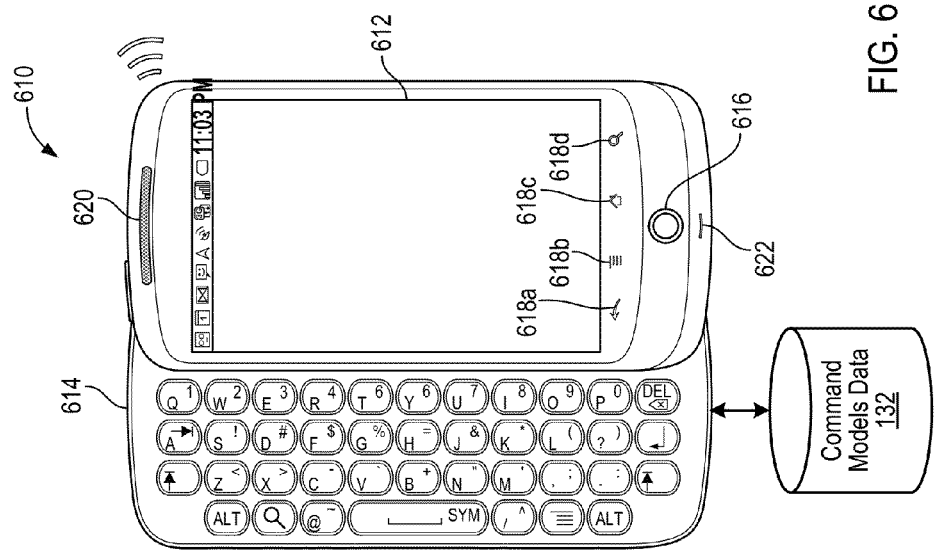

As described with reference to FIG. 6, a user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. The actions may be performed entirely by the user device, e.g., in the case of placing a phone call, or the user device may invoke an external service to perform the action, e.g., a map service or a search engine service. In some implementations, the user device 106 utilizes a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action.

As will be described in more detail below, each action A1, A2 . . . An has a corresponding command model CM1, CM2 . . . CMn, as indicated by the phantom box 108. The user device 106 utilizes the command models CMx to determine which, if any, actions are invoked in response to a voice input. As will be described in more detail the below, the command models are, in some implementations, grammars that describe sentence structures for particular commands. Other appropriate command models may also be used.

In some implementations, a language processing system 110 is used to generate command models data 132 that associates actions with corresponding command models by use of grammars. The command models data 132 store command models for actions that are respectively generated from user input data collected from crowdsourcing techniques described in more detail below. In some implementations, the command models are each configured to generate an action score for an action for an input sentence based on, for example, a semantic meaning of the input sentence.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

An example language processing system 110 includes a command model generator 130. The example architecture is illustrative only, and other appropriate functional architectures can also be used. The language processing system 110 learns, from a set of command sentences for a set of actions and from user feedback for each of the sentences, terms and phrases for each sentence that are terms that are categorized as one of non-terminals or terminals. From these categorizations, command model generator 130 generates a grammar for each sentence, and the generated grammar corresponds to a particular action with which the sentence is associated.

The command models are then provided to user devices. At run time, when an input sentence needs to be understood at a user device, the command model grammars are used to parse the input sentences to determine which, if any, actions may be invoked for a particular sentence.

Data Collection for Grammar Generation

Figure 2:
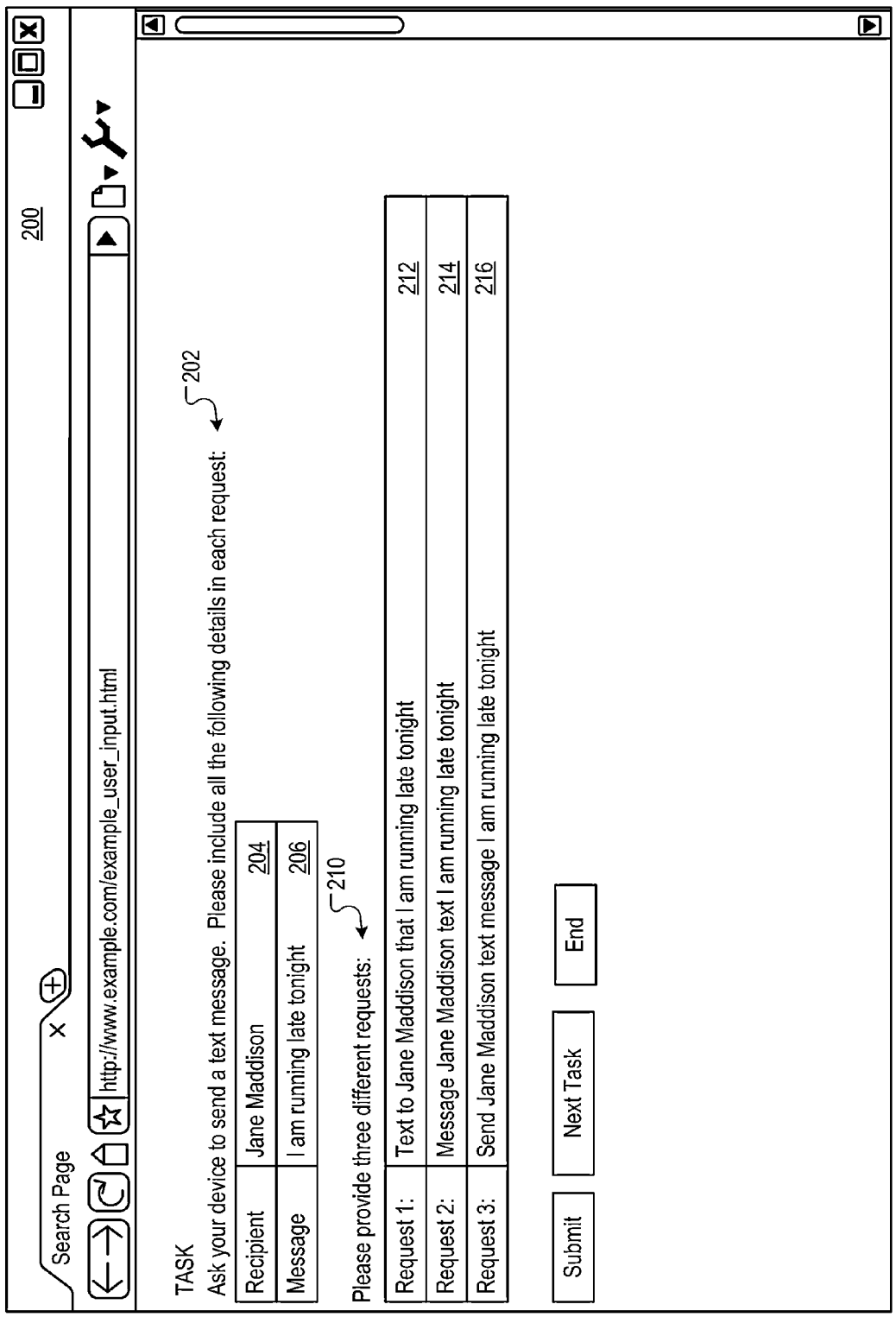
FIG. 2 is an illustration of a user interface for inputting proposed command inputs.
Figure 3:
FIG. 3 is an illustration of a user interface for classifying n-grams of a proposed command input.

As described above, the system 110 implements two data collections for each action in a set of actions. In the first data collection, the system 110 provides a first user interface to first user devices to collect data for proposed action queries. The first user devices are operated by first raters 140, which are persons that agree to perform the tasks outlined in the first user interface. FIG. 2 is an illustration of a user interface 200 for inputting proposed action queries. In the second data collection, the system provides a second user interface to second user devices operated by second raters 142. The second user interface facilitates the collation of data classifying the n-grams of the command sentence as either non-terminals or terminals. FIG. 3 is an illustration of a user interface for classifying n-grams of a proposed command input.

Figure 4:
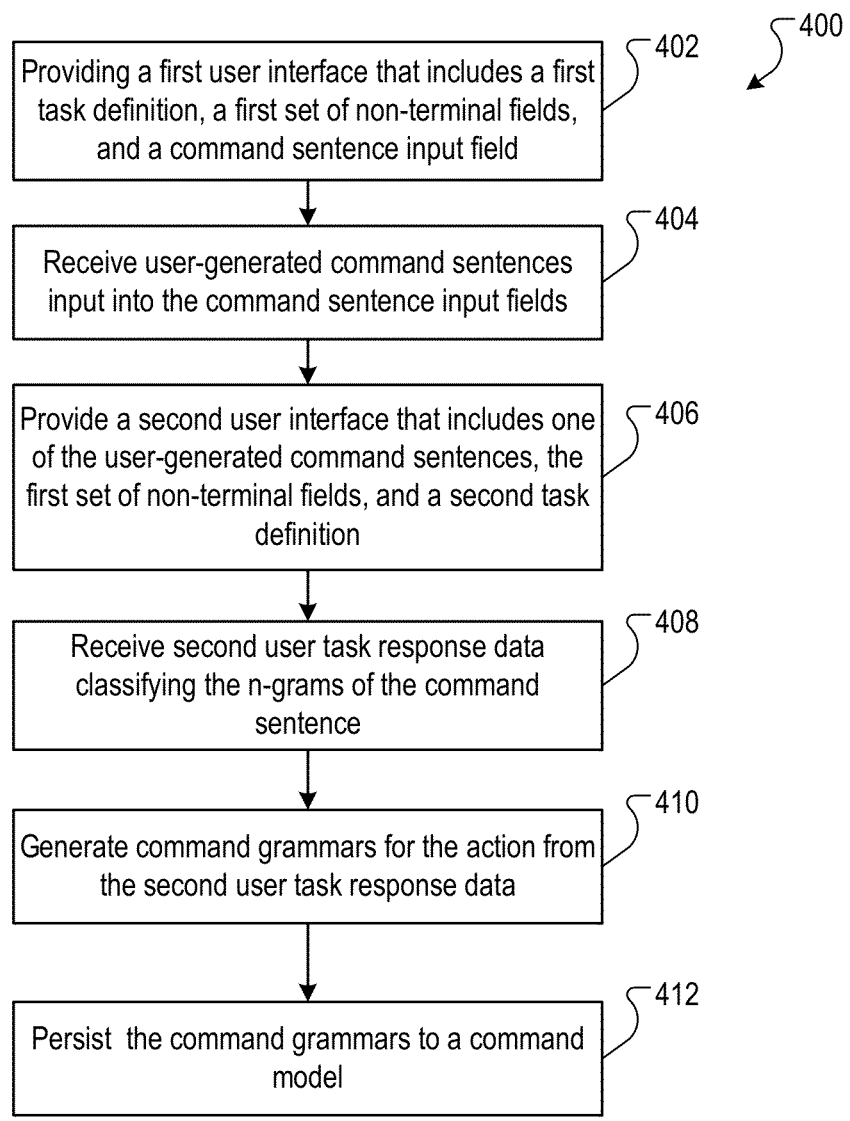
FIG. 4 is a flow diagram of an example process for generating parsing rules from proposed command inputs.

Collection of data through the user interfaces 200 and 300, and the processing of the collected data to generate the command model data 132, is described with respect to the process 400 of FIG. 4. The command model generator 130 accesses action data 114 that specifies particular actions for various applications. Each action defines user device operation that is different from user device operations for each other action. Example actions include a "call" action that places a phone call to a contact; a "text" action that sends a text message to a contact; a "map" action that maps a location; an "e-mail" action that sends an e-mail to a contact; and so on. The action data 114 may also have, for each action, example arguments for each action. These example arguments are provided to the raters as part of the tasks they perform.

For each action, the language processing system 110 provides a first user interface 200 that includes a first task definition, a first set of non-terminal fields, and a command sentence input field (402). FIG. 2 illustrates an example first user interface with the first task definition as outlined by instructions 202, and 210, a first set of non-terminal fields 204 and 206, and instructions 210 for inputting proposed action queries for command sentence input fields 212, 214 and 216.

The first task definition 202 describes a first user task to generate a command sentence for an action. For example, as shown in FIG. 2, the first task is described as instructing a user device to send a text message that reads "I am running late tonight" to a recipient, Jane Maddison.

The first set of non-terminal fields list a non-terminal type and a terminal that parses to the non-terminal type. For example, for the fields 204, the non-terminal of a first type listed is "Recipient," and the terminal is "Jane Maddison." For the fields 206, the non-terminal of a second type listed is "Message," and the terminal is "I am running late tonight." The non-terminal is an object that can be replaced by a terminal in a grammar.

The instructions 210 instruct the rater to input three different user-generated requests in the command sentence input fields 212, 214 and 216. Here, the user has input the three example requests shown in FIG. 2. Each request includes the recipient, "Jane Maddison," the message "I am running late tonight," and other text or words that the rater input to create the different requests.

After entering the proposed command inputs, the rater can select the "Submit" button, which, in turn, causes the system 110 to receive the user-generated command sentences input into the command sentence input fields (404). The user can then select the "Next Task" button to receive another task. The next task may relate to the same action, e.g., specify another recipient and message, or may relate to a different action, e.g., requesting a map route. For example, a map route request may have "Starting Location" non-terminal, a "Destination" non-terminal, etc.

The received data are stored in the command sentences data 112. By use of multiple raters 140, the system 110 collects a large set of command sentences for each action. The command sentences are then selected and each is provided to other raters 142. The raters 140 and 142 may be different sets of raters, or, alternatively, may be the same raters. In the case of the latter, a particular rater 140/142 is not provided with a command sentence that he or she generated for evaluation.

The system 110 provides a second user interface 300 that includes one of the user-generated command sentences 304, the first set of non-terminal fields 310 and 312, and a second task definition 302 as outlined by instructions 302, 308, and 314 (406). Any particular command sentence may be selected multiple times and provided to different raters 142 for evaluation.

The instructions 306 instruct the user to evaluate whether the command sentence 304 is a clear instruction for asking an interactive device to perform a task to which the sentence corresponds. Should the user select the "Yes" radio button, further evaluation may take place. Conversely, should the user select the "No" radio button, the evaluation of the command sentence 304 is complete. In FIG. 3, the user has selected the "Yes" radio button.

The non-terminal fields 310 and 312 each list a non-terminal type and a terminal that parses to the non-terminal type.

For example, for the fields 310, the non-terminal of a first type listed is "Recipient," and the terminal is "Jane Maddison." For the fields 312, the non-terminal of a second type listed is "Message," and the terminal is "I am running late tonight."

The instructions 308 instruct the user to classify each n-gram of the command sentence as belonging to one of the first set of non-terminal fields or none of the non-terminal types in the set of non-terminal types. The classifications can be made by use of a classification grid 316 that provides respective rows for the non-terminal type classifications and the "none" classification, and columns for each n-gram. The rater has selected the following classifications:

None: Text, to, that
Recipient: Jane, Maddison
Message: I, am, running, late, tonight The rater can select the "submit" button, which causes the user device to send the task response data to the system 110, which receives the second user task response data classifying the n-grams of the command sentence (408). The rater can then select another sentence by selecting the "Next Request" button, or end the session by selecting the "End" button.

The system stores the task response data with the command sentences 112, and then generates command grammars for the action from the second user task response data (410). In some implementations, a command grammar is generated for each set of task response data for each sentence. For example, for the sentence 304 of FIG. 3, the resulting command grammar may be of the form:

G=<T, N, S, R>;
where:
T={Text, to, Jane, Maddison, that, I, am, running, late, tonight}
N={Recipient, Message}
S=S
R={
S→Text to <Recipient> that <Message>
  Recipient→Jane Maddison
  Message→that, I, am, running, late, tonight
}

Because the terminals and non-terminals have been defined according to the specific task for the sentence, each rater need not be familiar with the general construction of grammars. However, by classifying the n-grams of each command sentence according to corresponding non-terminal types or terminals (the latter being a "none" classification), the user provides the necessary classification by which the command model generator 130 can generate a corresponding grammar. In particular, each of the command grammar defines non-terminals of each of the non-terminal types (e.g., <Jane Maddison> for the non-terminal Recipient, <I, am, running, late, tonight> for the non-terminal Message), and terminals selected by the user (e.g., <Text, to, that>). Because the terminals and non-terminals are defined by the rater, the rule for the start symbol S can be generated by parsing the command sentence. Thus, for the terminals defined above, a parse of "Text to Jane Maddison that I am running late tonight" would yield:

S→Text to <Recipient> that <Message>

The command grammars that are generated are then persisted to the command model data 132 (412). The command model data 132 may then be provided to user devices for use in parsing input commands, such as text input commands and voice input commands.

Each set of task response data for a command sentence may be used to generate a corresponding grammar for the sentence. In some implementations, the grammars for a particular action may be processed for pattern detection. Detected patterns of terminals and non-terminals are then use to generate additional grammars that can be used to parse multiple different command input sentences. To illustrate, assume the three grammar rules that are generated for the three input sentences of FIG. 2 are:

S→Text to <Recipient> that <Message>
S→Message <Recipient> text <Message>
S→Send <Recipient> text message <Message>

The command model generator 130, using one of a variety of appropriate pattern recognition techniques, determines the following grammar pattern:

S→<Terms1> <Recipient> <Terms2> <Message>

The non-terminals <Terms1> and <Terms2> are non-terminals that consume the text occurring between the text consumed for the non-terminals <Recipient> and <Message>. The resulting grammar is thus:

T={Text, to, message, send, Jane, Maddison, that, I, am, running, late, tonight}
N={Recipient, Message}
S=S
R={
S→<Terms1> <Recipient> <Terms2> <Message>
  Recipient Jane Maddison
  Message that, I, am, running, late, tonight
  Terms1 text, to, message, send
  Terms2 that, text, message
}

In variations of this implementation, the non-terminals <Terms1> and <Terms2> may consume any text that is not consumed by the non-terminals <Recipient> and <Message>. According, any command input of the form <Terms1> <Recipient> <Terms2> <Message> will result in a successful parse.

Parsing Input Sentences

Figure 5:
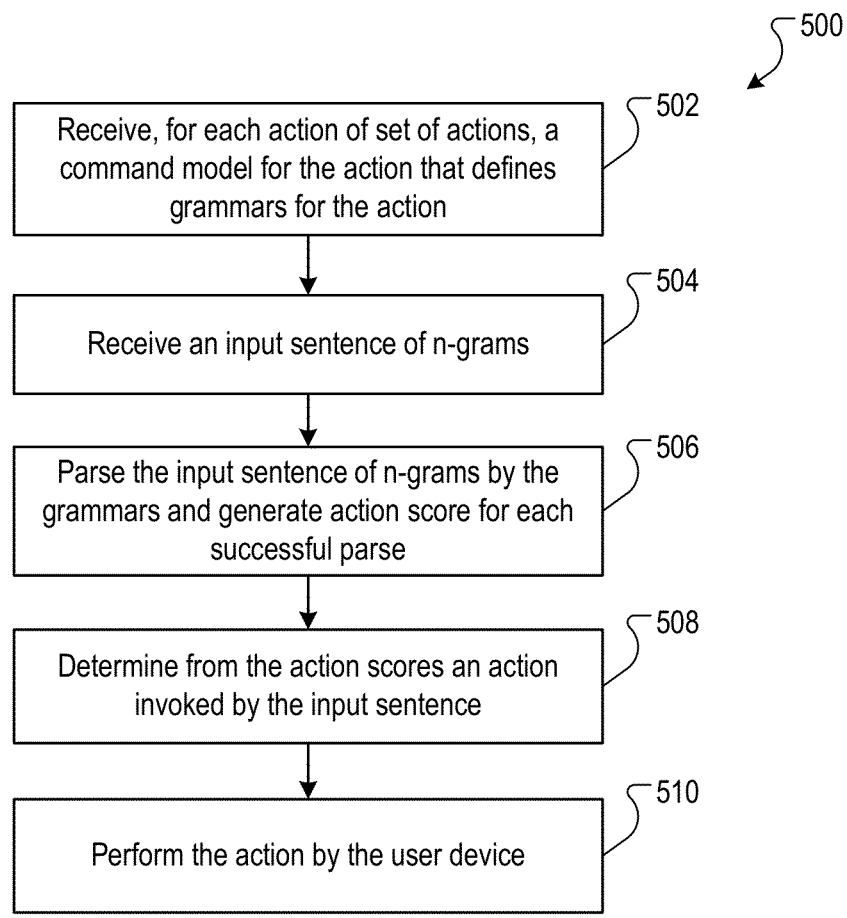
FIG. 5 is a flow diagram of an example process for parsing an input sentence using the parsing rules.

The command model data 132 is provided to user devices that use the command model data to parse input commands, such as voice input commands. FIG. 5 is a flow diagram of an example process 500 for parsing an input sentence using the parsing rules. The example process is implemented in a user device.

The process 500 receives, for each action of set of actions, a command model for the action that defines grammars for the action (502). For example, the process 500 may cause the user device to query the language processing system 110 for the command model data 132, and receives the command model data 132 sent in response to the request.

The process 500 receives an input sentence of n-grams (504). For example, a user of the user device may speak a voice command (or type in a command) in an attempt invoke a particular action. The voice data is processed to generate language text of n-grams that can be parsed and scored by the command models stored in the command models data 132.

The process 500 parses the input sentence of n-grams by the grammars and generates an action score for each successful parse (506). For each grammar for each action, the user device, using the data provided in the command model data 132, parses the input sentence.

In some implementations, the user device parses using a bottom-up parse. Other parsing techniques, such as a top down parse, can also be used, however.

For each grammar that consumes the entire input sentence, a successful parse is determined. For example, for the input sentence:

Text to Page that I just left work and will be home in 30 minutes the grammar with the rule S→Text to <Recipient> that <Message> would consume the input sentence. The yield of the <Recipient> non-terminal is "Page" and the yield of the message non-terminal is "I just left work and will be home in 30 minutes."

For each grammar that successfully parses the input sentence, an action score is determined. For example, the command models can be configured to generate, or facilitate the generation of, an action score according to any appropriate scoring algorithm. In some implementations, the action score may be based on a semantic score that is a measure of semantic meaning for the grammar for which there is a successful parse. For example, the semantic score may be based on the arguments of the semantic yields for each non-terminal being arguments that belong to a category defined by the non-terminal. To illustrate, for the command input sentence "Text to Page that I just left work and will be home in 30 minutes," the semantic score will be relative high as the semantic yield of the non-terminal <Recipient> is a recipient in an address book on the user device, and the semantic yield of the non-terminal <Message> appears to be a terms that do not invoke other actions.

Conversely, consider the sentence "Text to Empire State Building that What are your observation deck hours." Here, the semantic score would be relatively low, because the terms <Empire State Building> do not correspond to an actual recipient contact. Instead, the Empire State Building is a non-recipient entity.

The action score may also be based, in part, on the number of terminals consumed for each non-terminals to result in a successful parse. The more terminals that are required to consume a non-terminal may result in a lower action score. For example, consider the two start symbols for two different actions, the first being a text message action and the second being a voice memo action, and a command input sentence:

S→<Terms1> <Recipient> <Terms2> <Message>
S→<Memo Command> <Memo Text>

Voice memo Julia we have a party tomorrow and I need you to pick up cupcakes.

Assume also that the non-terminal "Memo Command" maps to the terminals "voice" and "memo." Both rules will fully consume the command input sentence up to the start symbol node. However, for the first start symbol corresponding to the text message action, there is some ambiguity with respect to the consumption of terms by the non-terminals <Terms2> and <Message>, i.e., there is no single successful parse of the terms. Conversely, for the second start symbol corresponding to the voice memo action, there is much less ambiguity, as the non-terminal <Memo Command> may only consume the terms "Voice memo." Accordingly, consumption up to the second start symbol will result in a higher score than consumption up to the first start symbol, as the second start symbol is reached by a more accurate, less ambiguous parse.

The scoring processes described above are examples of several appropriate scoring techniques that can be used. Other appropriate scoring techniques can also be used, however.

The process 500 determines from the action score an action invoked by the input sentence (508). For example, the process 500 will select the grammar with the highest action score, and the action corresponding to the grammar will be selected. For example, for the two grammars described above, the start symbol corresponding to the voice memo has the highest action score, and thus the voice memo action is selected.

The process 500 causes the user device to perform the action (510). For example, because the voice memo action is selected, the process invokes a voice memo application and records the audio corresponding to the text "Julia we have a party tomorrow and I need you to pick up cupcakes."

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
   providing, by the data processing apparatus to a first plurality of user devices, a first user interface that includes:
      a first task definition describing a first user task to generate a command sentence for an action;
      a first set of non-terminal fields, each non-terminal field in the set listing a non-terminal type and a terminal that parses to the non-terminal type; and
      a command sentence input field in which a user-generated command sentence is input by the user;
   receiving, by the data processing apparatus and from the plurality of user devices, user-generated command sentences input into the command sentence input field;
   providing, by the data processing apparatus to a second plurality of user devices, a second user interface that includes:
      one of the user-generated command sentences selected from the received user-generated command sentences;
      the first set of non-terminal fields, each non-terminal field in the first set listing the non-terminal type and the terminal that parses to the non-terminal type;
      a second task definition describing a second user task to classify each of a plurality of n-grams of the command sentence as belonging to one of:
         the non-terminal types in the set of non-terminal types; or
         none of the non-terminal types in the set of non-terminal types;
   receiving, by the data processing apparatus and from the second plurality of user devices, second user task response data classifying the n-grams of the command sentence, wherein for each non-terminal type at least a respective first set of n-grams are classified as belonging to the non-terminal type and at least a second set of n-grams are classified as belonging to none of the non-terminal types;
   generating, by the data processing apparatus, command grammars for the action from the second user task response data, each of the command grammars defining non-terminals of each of the non-terminal types and at least one terminal defining at least one of the second set of n-grams; and
   persisting the command grammars to a command model.

2. The computer-implemented method of claim 1, wherein the command sentence is a voice command sentence.

3. The computer-implemented method of claim 1, wherein the command model facilitates, for each command grammar, the generation of an action score for the action from a bottom-up parse of an input sentence using the command grammar.

4. The computer-implemented method of claim 1, wherein:
   each non-terminal type corresponds to a variable for the action; and
   for each non-terminal type, a semantic yield of a non-terminal of the non-terminal type defines an argument of the variable for the action.

5. A non-transitory computer readable storage medium storing instructions executable by a data processing apparatus and that upon such execution causes the data processing apparatus to perform operations comprising:
   providing, by the data processing apparatus to a first plurality of user devices, a first user interface that includes:
      a first task definition describing a first user task to generate a command sentence for an action;
      a first set of non-terminal fields, each non-terminal field in the set listing a non-terminal type and a terminal that parses to the non-terminal type; and
      a command sentence input field in which a user-generated command sentence is input by the user;
   receiving, by the data processing apparatus and from the plurality of user devices, user-generated command sentences input into the command sentence input field;
   providing, by the data processing apparatus to a second plurality of user devices, a second user interface that includes:
      one of the user-generated command sentences selected from the received user-generated command sentences;
      the first set of non-terminal fields, each non-terminal field in the first set listing the non-terminal type and the terminal that parses to the non-terminal type;
      a second task definition describing a second user task to classify each of a plurality of n-grams of the command sentence as belonging to one of:
         the non-terminal types in the set of non-terminal types; or
         none of the non-terminal types in the set of non-terminal types;
   receiving, by the data processing apparatus and from the second plurality of user devices, second user task response data classifying the n-grams of the command sentence, wherein for each non-terminal type at least a respective first set of n-grams are classified as belonging to the non-terminal type and at least a second set of n-grams are classified as belonging to none of the non-terminal types;
   generating, by the data processing apparatus, command grammars for the action from the second user task response data, each of the command grammars defining non-terminals of each of the non-terminal types and at least one terminal defining at least one of the second set of n-grams; and
   persisting the command grammars to a command model.

6. The non-transitory computer readable medium of claim 5, wherein the command model facilitates, for each command grammar, the generation of an action score for the action from a bottom-up parse of an input sentence using the command grammar.

7. The non-transitory computer readable medium of claim 5, wherein:
   each non-terminal type corresponds to a variable for the action; and
   for each non-terminal type, a semantic yield of a non-terminal of the non-terminal type defines an argument of the variable for the action.

8. The non-transitory computer readable medium of claim 5, wherein:
   each non-terminal type corresponds to a variable for the action; and
   for each non-terminal type, a semantic yield of a non-terminal of the non-terminal type defines an argument of the variable for the action.

9. A system, comprising:
   a data processing apparatus; and
   a non-transitory computer readable storage medium in data communication with the data processing apparatus storing instructions executable by the data processing apparatus and that upon such execution causes the data processing apparatus to perform operations comprising:

providing, by the data processing apparatus to a first plurality of user devices, a first user interface that includes:
   a first task definition describing a first user task to generate a command sentence for an action;
   a first set of non-terminal fields, each non-terminal field in the set listing a non-terminal type and a terminal that parses to the non-terminal type; and
   a command sentence input field in which a user-generated command sentence is input by the user;
receiving, by the data processing apparatus and from the plurality of user devices, user-generated command sentences input into the command sentence input field;
providing, by the data processing apparatus to a second plurality of user devices, a second user interface that includes:
   one of the user-generated command sentences selected from the received user-generated command sentences;
   the first set of non-terminal fields, each non-terminal field in the first set listing the non-terminal type and the terminal that parses to the non-terminal type;
   a second task definition describing a second user task to classify each of a plurality of n-grams of the command sentence as belonging to one of:
      the non-terminal types in the set of non-terminal types; or
      none of the non-terminal types in the set of non-terminal types;
receiving, by the data processing apparatus and from the second plurality of user devices, second user task response data classifying the n-grams of the command sentence, wherein for each non-terminal type at least a respective first set of n-grams are classified as belonging to the non-terminal type and at least a second set of n-grams are classified as belonging to none of the non-terminal types;
generating, by the data processing apparatus, command grammars for the action from the second user task response data, each of the command grammars defining non-terminals of each of the non-terminal types and at least one terminal defining at least one of the second set of n-grams; and
persisting the command grammars to a command model.

10. The system of claim 9, wherein the command model facilitates, for each command grammar, the generation of an action score for the action from a bottom-up parse of an input sentence using the command grammar.

11. The system of claim 9, wherein:
each non-terminal type corresponds to a variable for the action; and
for each non-terminal type, a semantic yield of a non-terminal of the non-terminal type defines an argument of the variable for the action.

12. The system of claim 9, wherein:
each non-terminal type corresponds to a variable for the action; and
for each non-terminal type, a semantic yield of a non-terminal of the non-terminal type defines an argument of the variable for the action.

* * * * *